United States Patent
Iwasaki (10) Patent No.: US 10,418,873 B2
(45) Date of Patent: Sep. 17, 2019

(54) BRUSHLESS MOTOR WITH STATOR HAVING TWELVE TEETH WITH CORRESPONDING COILS HAVING AXIALLY ARRANGED CONNECTING WIRES

(71) Applicant: MABUCHI MOTOR CO., LTD., Matsudo, Chiba (JP)

(72) Inventor: Yuya Iwasaki, Matsudo (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 321 days.

(21) Appl. No.: 14/696,717

(22) Filed: Apr. 27, 2015

(65) Prior Publication Data

US 2015/0311760 A1 Oct. 29, 2015

(30) Foreign Application Priority Data

Apr. 28, 2014 (JP) .................................. 2014-092782

(51) Int. Cl.
*H02K 3/28* (2006.01)
*H02K 29/00* (2006.01)

(52) U.S. Cl.
CPC ............... *H02K 3/28* (2013.01); *H02K 29/00* (2013.01)

(58) Field of Classification Search
CPC ........ H02K 3/28; H02K 3/50; H02K 2203/06; H02K 3/18; H02K 3/00–28; H02K 29/00

(Continued)

(56) References Cited

U.S. PATENT DOCUMENTS

| 5,675,196 A * | 10/1997 | Huang | G11B 5/012 |
| | | | 310/184 |
| 7,763,998 B2 * | 7/2010 | Makino | H02K 3/522 |
| | | | 310/71 |

(Continued)

FOREIGN PATENT DOCUMENTS

| CN | 1178609 A | 4/1998 |
| CN | 1720653 A | 1/2006 |

(Continued)

OTHER PUBLICATIONS

STIC EIC 2800 Search Report 543264 on May 25, 2017.*

(Continued)

*Primary Examiner* — Julio C. Gonzalez
*Assistant Examiner* — Maged M Almawri
(74) *Attorney, Agent, or Firm* — Schwabe Williamson & Wyatt, PC (57) ABSTRACT

A brushless motor includes: a stator including an annular stator core and first through twelfth teeth provided circumferentially on an inner circumference of the stator core in a sequential order; first through twelfth coils wound around the first through twelfth teeth, respectively, and forming a delta connection; and a rotor provided at a center of the stator. The first through twelfth coils are configured such that: the twelfth, first, six, and seventh coils in series connection form a W-phase; the eighth, ninth, second, and third coils in series connection form a U-phase, the fourth, fifth, tenth, and eleventh coils in series connection form a V-phase, coils of different phases adjacent to each other in an arrangement on the teeth are wound in the same direction, and coils of the same phase adjacent to each other are wound in opposite directions.

16 Claims, 6 Drawing Sheets

(58) Field of Classification Search
USPC .............................. 310/184–208, 71; 29/596
See application file for complete search history.

(56) References Cited

U.S. PATENT DOCUMENTS

| | | | |
|---|---|---|---|
| 8,760,019 B2* | 6/2014 | Mori | H02K 3/28 310/184 |
| 2005/0236922 A1* | 10/2005 | Yoneda | H02K 3/00 |
| 2006/0091745 A1* | 5/2006 | Klappenbach | H02K 3/522 310/71 |
| 2007/0182265 A1 | 8/2007 | Makino | |
| 2007/0257566 A1* | 11/2007 | Vollmer | H02K 3/28 310/180 |
| 2011/0001373 A1 | 1/2011 | Mori | |
| 2011/0156512 A1 | 6/2011 | Shimomura | |
| 2012/0256514 A1* | 10/2012 | Junak | H02K 1/146 310/216.092 |
| 2014/0028130 A1 | 1/2014 | Sonoda | |
| 2015/0311760 A1 | 10/2015 | Iwasaki | |

FOREIGN PATENT DOCUMENTS

| | | | |
|---|---|---|---|
| CN | 102577028 A | | 7/2012 |
| CN | 102780337 A | | 11/2012 |
| CN | 103548244 A | | 1/2014 |
| JP | 09-191588 | | 7/1997 |
| JP | 2005-312278 A | | 11/2005 |
| JP | 2010-183662 | | 8/2010 |
| JP | 2010-183662 A | | 8/2010 |
| JP | 2010-200486 | * | 9/2010 |
| JP | 2010-200486 A | | 9/2010 |
| JP | 2012-517209 A | | 7/2012 |
| JP | 2013-236455 A | | 11/2013 |
| WO | 2009/060600 A1 | | 5/2009 |
| WO | 2013/030913 A1 | | 3/2013 |

OTHER PUBLICATIONS

JP 2010-200486 English Translation.*
The State Intellectual Property Office of People's Republic of China; First Office Action for Chinese Application No. 201510205836.X dated Aug. 11, 2017; 15 pages including English translation.
Notification of Reasons for Refusal for Japanese Application No. 2014-092782 dated Aug. 8, 2017; 8 pages including English translation.
Notification of Reasons for Refusal for Japanese Application No. 2014-092782 dated Feb. 16, 2018; 9 pages including English translation.
Office Action issued for Chinese Patent Application No. 201510205836.X dated Apr. 11, 2018; 20 pages, including English translation.
Decision to Decline the Amendment for Japanese Patent Application No. 2014-092782 dated Jul. 30, 2018; 7 pages including English Translation.
Decision of Refusal for Japanese Patent Application No. 2014-092782 dated Jul. 30, 2018; 2 pages including English Translation.
Third Notice of Reason for Refusal for CN Application No. 201510205836, dated Dec. 12, 2018; 14 pages including English translation.
Notice of Reasons for Refusal issued in Japanese Application No. 2018-205056 drafted on Jul. 24, 2019; 6 pages including English translation.

* cited by examiner

BRUSHLESS MOTOR WITH STATOR HAVING TWELVE TEETH WITH CORRESPONDING COILS HAVING AXIALLY ARRANGED CONNECTING WIRES

CROSS-REFERENCE TO RELATED APPLICATIONS

This application is based upon and claims the benefit of priority from the prior Japanese Patent Application No. 2014-092782, filed on Apr. 28, 2014, the entire content of which is incorporated herein by reference.

BACKGROUND OF THE INVENTION

1. Field of the Invention

The present invention relates to a brushless motor.

2. Description of the Related Art

In the conventional practice, motors are used as driving sources of various types of apparatuses and products. For example, the motors are used for business machines, such as printers and copying machines, various kinds of home electric appliances, and power assist sources of vehicles, such as automobiles and power-assisted bicycles. In particular, brushless motors are sometimes used as the driving sources of movable parts with high operation frequency in the light of increased durability and reduced noise.

A brushless motor of inner rotor type is known. A stator is disposed around a rotor and coils are wound around a plurality of stator teeth provided in the stator. Various methods for winding coils around a plurality of stator teeth are known. For example, a synchronous machine in which the coils are delta-connected or start-connected is disclosed (see patent document 1).

[patent document 1] JP2012-517209

In one type of synchronous machines, a delta connection is achieved by continuous wire connection. Continuous connection requires a large number of connecting wires that bridge stator teeth of the same phase at a distance from each other and so requires spaces for disposing connecting wires, and substitute components such as bus bars. Because connecting wires do not generate a magnetic force in the stator that contributes to the motor property, the number of connecting wires is preferably reduced as much as possible.

SUMMARY OF THE INVENTION

The present invention addresses the issue and a purpose thereof is to provide a technology of realizing a brushless motor with a compact size and a high torque by a novel approach for stator coils.

A brushless motor includes: a stator including an annular stator core and first through twelfth teeth provided circumferentially on an inner circumference of the stator core in a sequential order; first through twelfth coils wound around the first through twelfth teeth, respectively, and forming a delta connection; and a rotor provided at a center of the stator. The first through twelfth coils are configured such that: the twelfth, first, six, and seventh coils in series connection form a W-phase; the eighth, ninth, second, and third coils in series connection form a U-phase, the fourth, fifth, tenth, and eleventh coils in series connection form a V-phase, coils of different phases adjacent to each other in an arrangement on the teeth are wound in the same direction, and coils of the same phase adjacent to each other are wound in opposite directions. The W-phase includes a first connecting wire connecting the first coil and the sixth coil. The U-phase includes a second connecting wire connecting the ninth coil and the second coil. The V-phase includes a third connecting wire connecting the fifth coil and the tenth coil.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

The brushless motor according to an embodiment of the present invention includes an annular stator, first through twelfth teeth provided circumferentially on the inner circumference of the stator core in a sequential order. The brushless motor also includes first through twelfth coils wound around the first through twelfth teeth, respectively, and forming a delta connection, and a rotor provided at the center of the stator. The first through twelfth are configured such that the twelfth, first, sixth, and seventh coils in series connection form a W phase. The eighth, ninth, second, and third coils in series connection form a U phase. The fourth, fifth, tenth, and eleventh coils in series connection form a V phase. Coils of different phases adjacent to each other in the arrangement on the teeth are wound in the same direction, and coils of the same phase adjacent to each other are wound in opposite directions. The W phase includes a first connecting (jumper) wire connecting the first and sixth coils. The U phase includes a second connecting wire connecting the ninth and second coils. The V phase includes a third connecting wire connecting the fifth and tenth coils.

According to the embodiment, the length of connecting wires connecting coils at a distance is reduced.

The end of the U-phase coil and the lead of the V-phase coil are guided outside from the adjacent coils, or the end of the V-phase coil and the lead of the W-phase coil are guided outside from the adjacent coils, or the end of the W-phase coil and the lead of the U-phase coil are guided outside from the adjacent coils so that the lead and the end of the coils wound through teeth are handled easily and the length of wire connection is reduced. Accordingly, the amount of coils not generating a magnetic force in the stator that contributes to the motor property is reduced, the coil resistance is reduced, and the space required for disposing coils is reduced.

The first through third connecting wires may be disposed so that the coils do not cross each other. This improves the reliability of insulation and contributes to the reduction of thickness and size of the motor.

The first through third connecting wires may be disposed at the outer edge of one of the axial end surfaces of the stator core. The first and third connecting wires may be disposed such that the wires overlap in part in the axial direction and are disposed at different axial positions. The second connecting wire may include a bent part extending from below the third connecting wire and toward and above the first connecting wire in the axial direction. This ensures that the number of connecting wires overlapping in a top view of the stator is 2 or fewer and contributes to the reduction of thickness and size of the motor.

Optional combinations of the aforementioned constituting elements, and implementations of the invention in the form of components, manufacturing methods, and systems may also be practiced as additional modes of the present invention. According to the embodiment, a brushless motor with a compact size and a high torque can be realized.

A description will be given of an embodiment of the present invention with reference to the drawings. Like numerals represent like elements so that the description will be omitted accordingly. The structure described below is by way of example only and does not limit the scope of the invention. A description is given hereunder using a brushless motor of an inner rotor type as an example.

First Embodiment (Brushless Motor)

Figure 1:
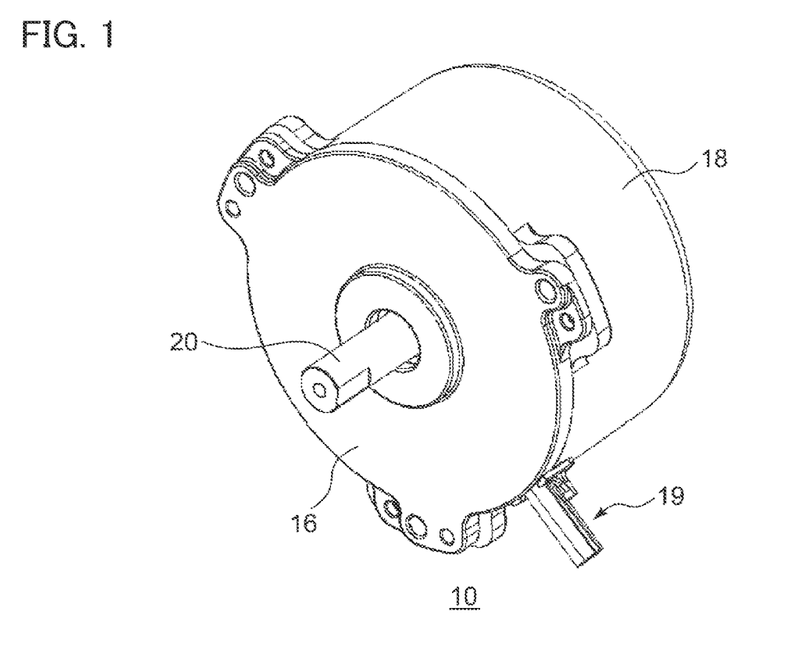
FIG. 1 is an overall perspective of a brushless motor according to the first embodiment.
Figure 2:
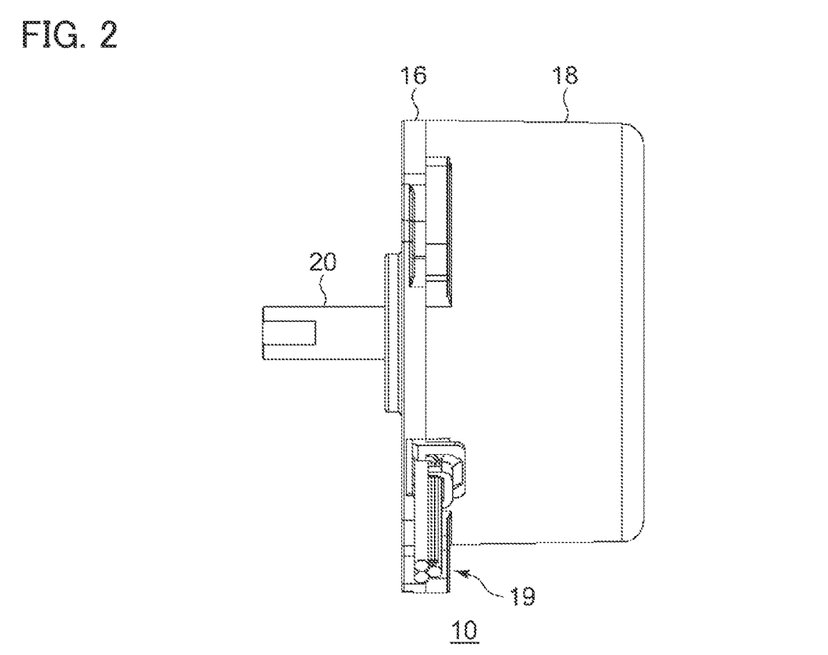
FIG. 2 is a side view of the brushless motor according to the first embodiment.
Figure 3:
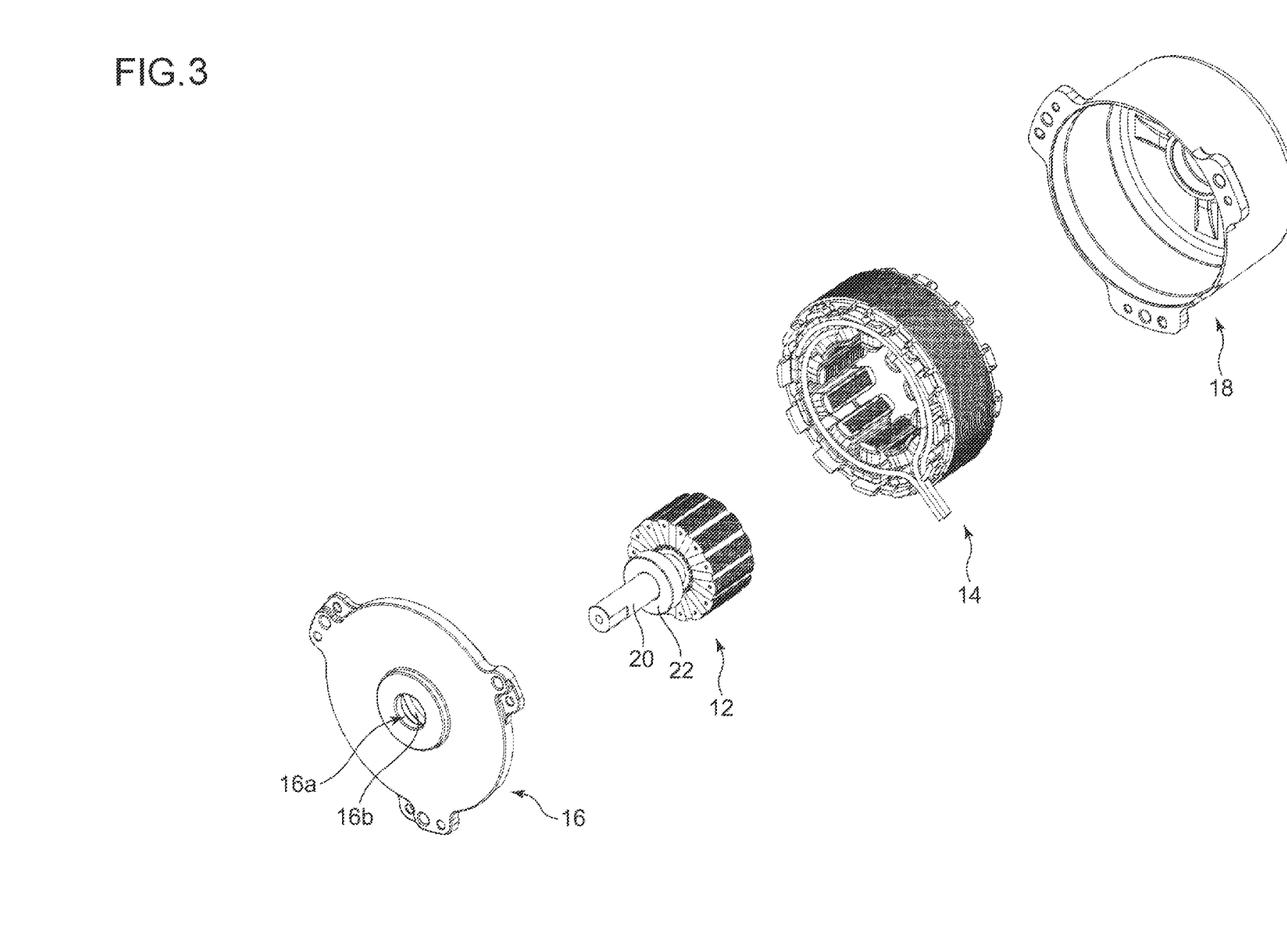
FIG. 3 is an exploded perspective view of the brushless motor according to the first embodiment.

FIG. 1 is an overall perspective view of the brushless motor according to the first embodiment. FIG. 2 is a side view of the brushless motor according to the first embodiment. FIG. 3 is an exploded perspective view of the brushless motor according to the first embodiment.

The brushless motor (hereinafter, sometimes referred to as "motor") 10 according to the embodiment includes a columnar rotor 12 including magnets, a stator 14 including at its center a space for disposing the rotor 12, a front bell 16, a housing body 18, and a power feeder 19.

The front bell 16, which is a plate-shaped member, has a hole 16a formed in a central part so that a rotating shaft 20 can penetrate therethrough, and is formed with a recess 16b near the hole 16a to hold a bearing 22. The front bell 16 supports a portion of the rotating shaft 20 of the rotor 12 via the bearing 22. The housing body 18 is a cylindrical member. A recess 18b for supporting a bearing (not shown) is formed at the center of the base 18a. The housing body 18 supports the other portion of the rotating shaft 20 of the rotor 12 via the bearing. According to the first embodiment, the front bell 16 and the housing body 18 constitute a housing member for housing the rotor 12 and the stator 14.

(Stator)

Figure 4:
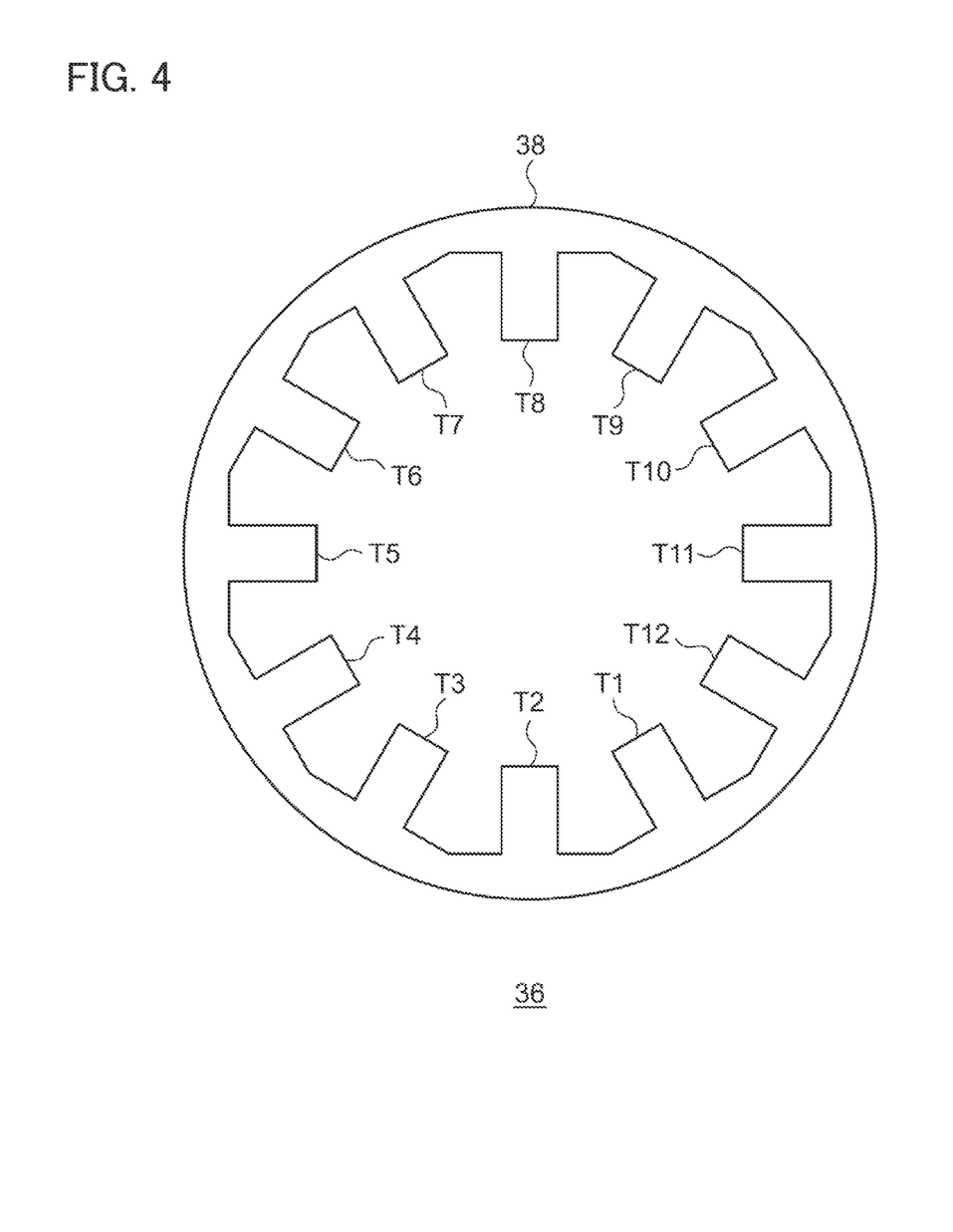
FIG. 4 is a top view of the stator core.
Figure 5:
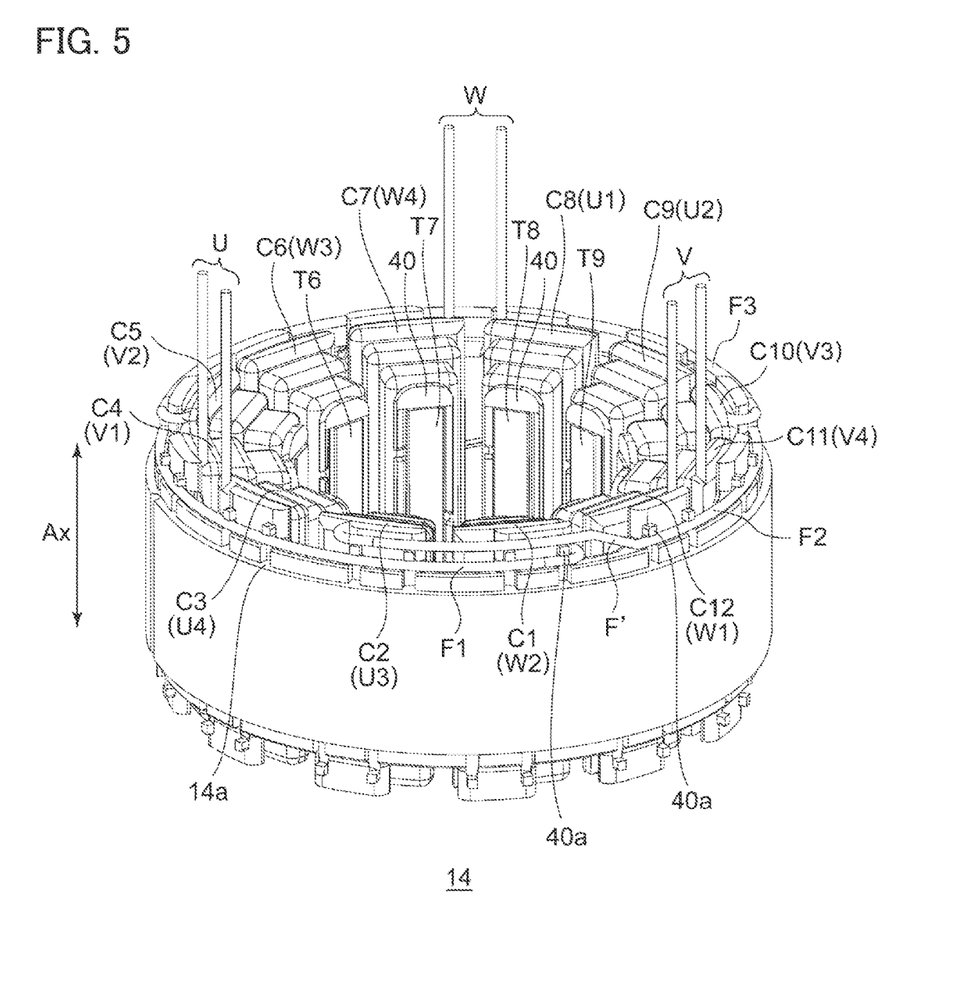
FIG. 5 is a perspective view of the stator.

The structure of the stator 14 will be described. FIG. 4 is a top view of a stator core. FIG. 5 is a perspective view of the stator 14. FIG. 4 shows the shape of the stator core only schematically and the details are omitted.

A stator core 36 is a cylindrical (annular) member in which a plurality of plate-shaped stator yokes 38 are laminated. A total of 12 teeth T1-T1 are circumferentially provided on the inner circumference of the stator yoke 38 in a sequential order so as to face the center.

An insulator 40 is attached to each of the teeth T1-T12. Then, a conductor (copper wire) is wound around the insulator 40 for each of the teeth T1-T12 so as to form first coil C1 through twelfth coil C12 (see FIG. 5). Then, the rotor 12 is placed at the center of the stator 14 that has been completed through the above processes.

Figure 6:
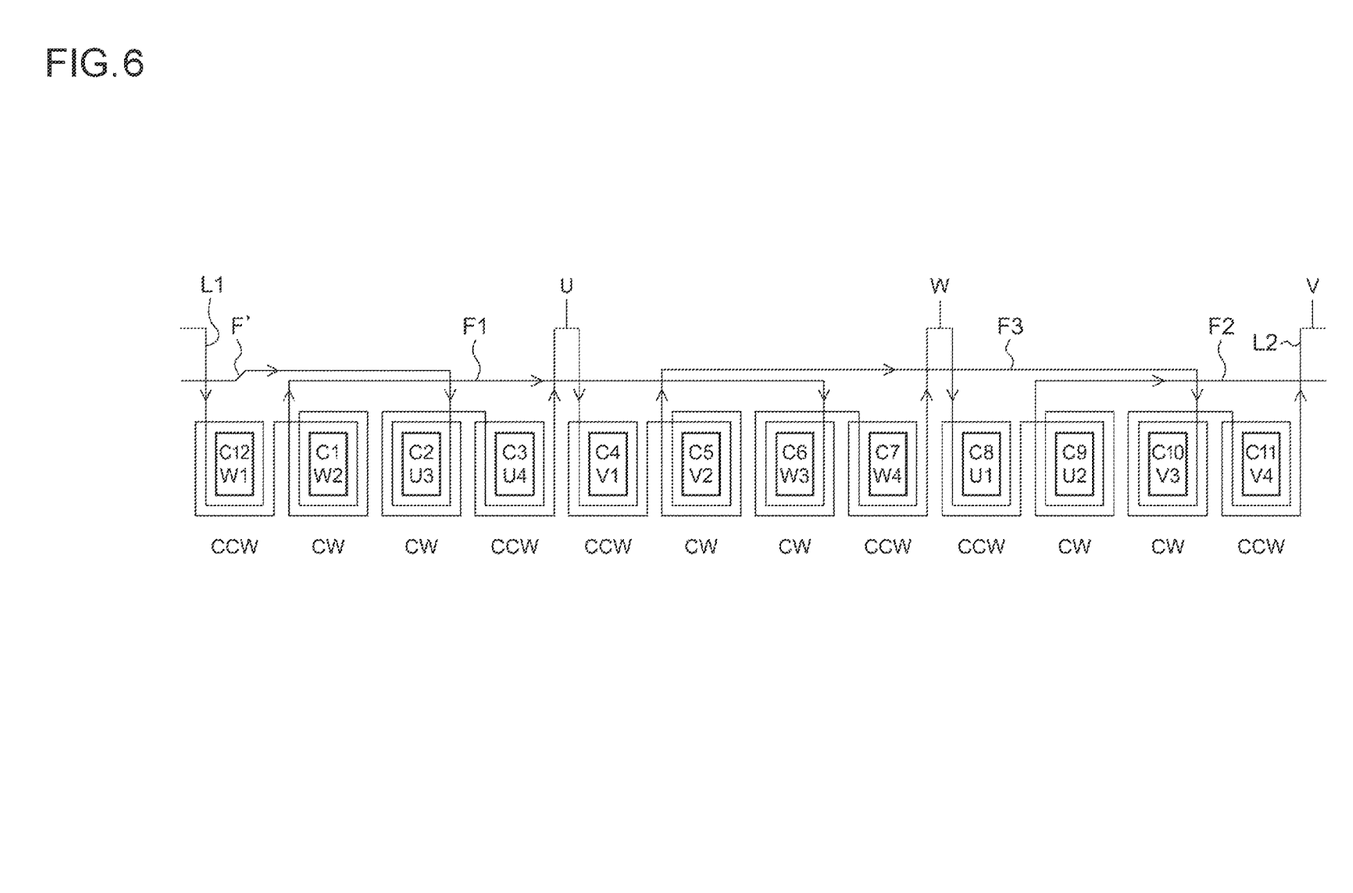
FIG. 6 schematically shows the delta connection of the stator according to the embodiment.

FIG. 6 schematically shows the delta connection of the stator 14 according to the embodiment.

A detailed description will be given of how the coils are wound with reference to FIGS. 5 and 6. The exemplary wire connection structure shown in FIG. 6 is achieved by using a coil winding machine of nozzle type. The wire connection remains principally unchanged even if the U-phase, V-phase, and W-phase are interchanged. A description will now be given of a case in which the twelfth coil C12 is formed first.

As shown in FIG. 6, the W-phase is first formed by forming the twelfth coil C12 in the counterclockwise direction (CCW), forming the first coil C1 in the clockwise direction (CW), forming the sixth coil C6 in the clockwise direction across the first connecting wire F1, and forming the seventh coil C7 in the counterclockwise direction. The twelfth coil C12, the first coil C1, the sixth coil C6, and the seventh coil C7 connected in series in the stated order form the W-phase.

After the seventh coil C7 is formed, the eighth coil C8 is formed in continuity in the counterclockwise direction, the ninth coil C9 is formed in the clockwise direction, the second coil C2 is formed in the clockwise direction across the second connecting wire F2, and the third coil C3 is formed in the counterclockwise direction. The eighth coil C8, the ninth coil C9, the second coil C2, and the third coil C3 connected in series in the stated order form the U-phase.

After the third coil C3 is formed, the fourth coil C4 is formed in continuity in the counterclockwise direction, the fifth coil C5 is formed in the clockwise direction, the tenth coil C10 is formed in the clockwise direction across the third connecting wire F3, and the eleventh coil C11 is formed in the counterclockwise direction. The fourth coil C4, the fifth coil C5, the tenth coil C10, and the eleventh coil C11 connected in series in the stated order form the V-phase. Subsequently, the lead L1 of the W-phase coil and the end L2 of the V-phase coil are connected, thereby forming a delta connection.

The adjacent coils of different phases (W-phase and U-phase, U-phase and V-phase, V-phase and W-phase) are wound in the same direction and the adjacent coils of the same phase are wound in the opposite directions.

Thus, a delta connection connecting the first coil C1 through the twelfth coil C12 of the stator 14 according to the first embodiment is realized by a continuous operation of the coil winding machine. The length of the connecting wires connecting coils at a distance in the stator 14 is reduced as compared to the related art. Since the end of the U-phase coil and the lead of the V-phase coil are guided outside from the same inter-teeth space between the adjacent coils, or the end of the V-phase coil and the lead of the W-phase coil are guided outside from the same inter-teeth space between the adjacent coils, or the end of the W-phase coil and the lead of the U-phase coil are guided outside from the same inter-teeth space between the adjacent coils, the lead and the end of the coils wound around the teeth can be handled easily and the length of wire connection is reduced. Accordingly, the amount of coils not generating a magnetic force in the stator that contributes to the motor property is reduced, the coil resistance is reduced, and the space required for disposing coils is reduced. In other words, a brushless motor with a compact size and a high torque can be realized by using a novel approach to wind coils around the stator.

The first connecting wire F1-the third connecting wire F3 according to the embodiment are disposed such that the lines do not cross each other. This prevents contact between the connecting wires, improves the reliability of insulation, and contributes to the reduction of thickness and size of the motor. To describe it in further details, as shown in FIG. 5, the first through third connecting wires F1-F3 are disposed in an arc shape around an outer edge 14a of the insulator at one of the end surfaces of the stator core 36 in the axial direction Ax. The first connecting wire F1 and the third connecting wire F3 overlap in part as viewed in the axial direction Ax and are disposed at different axial positions. The second connecting wire F2 includes a bent part F' extending from below the third connecting wire F3 and toward and above the first connecting wire in the axial direction. This ensures that the number of connecting wires overlapping in a top view of the stator is 2 or fewer and contributes to the reduction of thickness and size of the motor.

The rear surface (outer circumferential surface) of each insulator 40 is provided with a locking part 40a for controlling the movement of the connecting wires. This fixes the connecting wires at desired positions. Of particular note, the second connecting wire F2 according to the embodiment is firmly fixed at the desired position because it is maintained in a tensioned state by being supported in different directions by the two locking parts 40a before and after the bent part F'.

Second Embodiment

Figure 7:
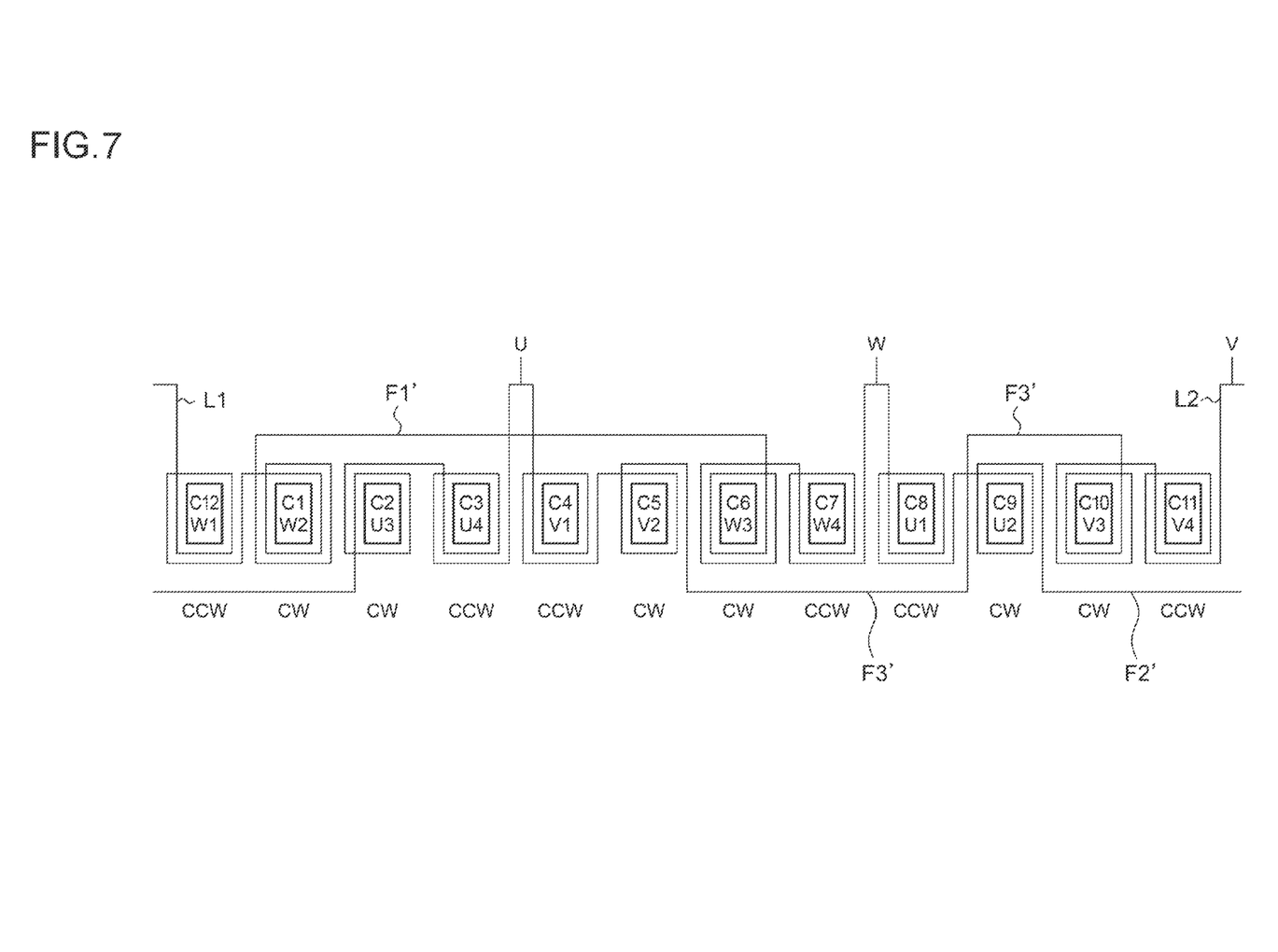
FIG. 7 schematically shows the delta connection of the stator according to a second embodiment.

FIG. 7 schematically shows the delta connection of the stator according to a second embodiment. The exemplary connection structure shown in FIG. 7 is achieved by using a coil winding machine of flyer type. A description will now be given of a case in which the twelfth coil C12 is formed first. Those features that are similar to the features of the first embodiment are not described.

As shown in FIG. 7, the W-phase is first formed by forming the twelfth coil C12 in the counterclockwise direction (CCW), forming the first coil C1 in the clockwise direction (CW), forming the sixth coil C6 in the clockwise direction across the first connecting wire F1' formed adjacent to one of the end surfaces of the stator (toward the top of FIG. 7), and forming the seventh coil C7 in the counterclockwise direction. The twelfth coil C12, the first coil C1, the sixth coil C6, and the seventh coil C7 connected in series in the stated order form the W-phase.

After the seventh coil C7 is formed, the eighth coil C8 is formed in continuity in the counterclockwise direction, the ninth coil C9 is formed in the clockwise direction, the second coil C2 is formed in the clockwise direction across the second connecting wire F2' formed adjacent to the other end surface of the stator (toward the bottom of FIG. 7), and the third coil C3 is formed in the counterclockwise direction. The eighth coil C8, the ninth coil C9, the second coil C2, and the third coil C3 connected in series in the stated order form the U-phase.

After the third coil C3 is formed, the fourth coil C4 is formed in continuity in the counterclockwise direction, the fifth coil C5 is formed in the clockwise direction, the tenth coil C10 is formed in the clockwise direction across the third connecting wire F3' extending from adjacent to one of the end surfaces of the stator toward the other end surface thereof, and the eleventh coil C11 is formed in the counterclockwise direction. The fourth coil C4, the fifth coil C5, the tenth coil C10, and the eleventh coil C11 connected in series in the stated order form the V-phase. Subsequently, the lead L1 of the W-phase coil and the end L2 of the V-phase are connected, thereby forming a delta connection.

The same advantage as obtained in the first embodiment is also obtained by using a coil winding machine of flyer type.

As described above, the number and length of connecting coils not contributing to the motor property is reduced in the brushless motor according to the embodiment. As a result, the motor efficiency is improved due to the reduced resistance in the winding (coil). Because the steps required to wind the coils are identical from phase to phase, variation in winding resistance between the phases is reduced and the motor performance is stabilized. Since the total number of connecting wires adjacent to the respective end surfaces of the stator can be reduced to 2 or fewer, the space required for wire connection and for disposing connecting wires is reduced so that the size of the motor as a whole is reduced. Further, the entire coils can be formed by continuous wires without wastefully using wires for handling the lead and the end. Since the lead of any given phase is aligned with the end of another phase, wire connection between the wound coils is facilitated. By using the novel winding structure of the embodiment, the coils wound around the respective teeth do not come loose so that a high-quality motor without loose wires can be realized. The brushless motor according to the embodiment can be configured with a desirable wire connection structure without requiring bus bars or a complicated connection mechanism.

A description will now be given of the specification of the brushless motor in which the embodiment can be suitably used. The outer diameter of the brushless motor according to the embodiment is about 30-140 mm and, preferably, about 35-85 mm. The number of grooves (teeth) of the stator is, for example, 12. It is preferable that the number of magnets be 10 or 14. The magnetic force (energy product) on the main surface of the magnet is 8 MGOe or higher, and, preferably, 10 MGOe or higher, and, more preferably, 30 MGOe or higher. Further, the diameter of the rotor is preferably 20-70 mm.

The embodiments of the present invention are not limited to those described above and appropriate combinations or replacements of the features of the embodiments are also encompassed by the present invention. The embodiments may be modified by way of combinations, rearranging of the processing sequence, design changes, etc., based on the knowledge of a skilled person, and such modifications are also within the scope of the present invention.

What is claimed is:
1. A brushless motor comprising:
   a stator including an annular stator core and first through twelfth teeth provided circumferentially on an inner circumference of the stator core in a sequential order;
   first through twelfth coils wound around the first through twelfth teeth, respectively, and forming a delta connection; and
   a rotor provided at a center of the stator, wherein
   the first through twelfth coils are configured such that:
   the twelfth, first, sixth, and seventh coils in series connection form a W-phase;
   the eighth, ninth, second, and third coils in series connection form a U-phase,
   the fourth, fifth, tenth, and eleventh coils in series connection form a V-phase,
   coils of different phases adjacent to each other in an arrangement on the teeth are wound in the same direction,
   coils of the same phase adjacent to each other are wound in opposite directions, the W-phase includes a first connecting wire provided between a space between the twelfth coil and the first coil and a space between the sixth coil and the seventh coil and connecting the first coil and the sixth coil, the U-phase includes a second connecting wire provided between a space between the eighth coil and the ninth coil and a space between the second coil and the third coil and connecting the ninth coil and the second coil, and the V-phase includes a third connecting wire provided between a space between the fourth coil and the fifth coil and a space between the tenth coil and the eleventh coil and connecting the fifth coil and the tenth coil, wherein the first through third connecting wires are disposed at one axial end surfaces of the stator core, and a number of the connecting wires overlapping in an axial direction is 2 or fewer, the end of the coil forming the U-phase and the lead of the coil forming the V-phase are guided outside from the same inter-teeth space between the adjacent coils, or the end of the coil forming the V-phase and the lead of the coil forming the W-phase are guided outside from the same inter-teeth space between the adjacent coils, or the end of the coil forming the W-phase and the lead of the coil forming the U-phase are guided outside from the same inter-teeth space between the adjacent coils, and a tip of the lead of the coil, a tip of the end of the coil, and a tip of the first through third connecting wires extend from an outer edge of one of the axial end surfaces of the stator core.

2. The brushless motor according to claim 1, wherein
the twelfth, the first, the sixth, and the seventh coils are connected in series in the stated order to form the W-phase,
the eighth, the ninth, the second, and the third coils are connected in series in the stated order to form the U-phase,
the fourth, the fifth, the tenth, and the eleventh coils are connected in series in the stated order to form the V-phase.

3. The brushless motor according to claim 1, wherein
the first through third connecting wires are provided along a same first circumference,
the lead of the W-phase and the end of the V-phase, the lead of the V-phase and the end of the U-phase, and the lead of the U-phase and the end of the W-phase are provided along a second circumference having a diameter different from that of the first circumference.

4. The brushless motor according to claim 1, wherein
the stator core is a cylindrical core in which an annular part is integrally connected, and
the first through twelfth coils and the first through third connecting wires are continuous electric wires.

5. The brushless motor according to claim 1, wherein the first through third connecting wires are disposed so that the coils do not cross each other.

6. The brushless motor according to claim 5, wherein
the first through third connecting wires are disposed at an outer edge of one axial end surface of the stator core,
the first and third connecting wires are disposed such that the wires overlap in part in an axial direction and are disposed at different axial positions, and
the second connecting wire includes a bent part extending from below the third connecting wire and toward and above the first connecting wire in the axial direction.

7. The brushless motor according to claim 6, wherein
the bent part is provided between the first coil and the twelfth coil.

8. A brushless motor comprising:
a stator including an annular stator core and first through twelfth teeth provided circumferentially on an inner circumference of the stator core in a sequential order;
first through twelfth coils wound around the first through twelfth teeth, respectively, and forming a delta connection; and
a rotor provided at a center of the stator, wherein
the first through twelfth coils are configured such that:
the twelfth, first, sixth, and seventh coils in series connection form a W-phase;
the eighth, ninth, second, and third coils in series connection form a U-phase,
the fourth, fifth, tenth, and eleventh coils in series connection form a V-phase,
coils of different phases adjacent to each other in an arrangement on the teeth are wound in the same direction,
coils of the same phase adjacent to each other are wound in opposite directions,
the W-phase includes a first connecting wire provided between a space between the twelfth coil and the first coil and a space between the sixth coil and the seventh coil and connecting the first coil and the sixth coil,
the U-phase includes a second connecting wire provided between a space between the eighth coil and the ninth coil and a space between the second coil and the third coil and connecting the ninth coil and the second coil, and
the V-phase includes a third connecting wire provided between a space between the fourth coil and the fifth coil and a space between the tenth coil and the eleventh coil and connecting the fifth coil and the tenth coil,
wherein the end of the coil forming the U-phase and the lead of the coil forming the V-phase are guided outside from the same inter-teeth space between the adjacent coils, or the end of the coil forming the V-phase and the lead of the coil forming the W-phase are guided outside from the same inter-teeth space between the adjacent coils, or the end of the coil forming the W-phase and the lead of coil forming the U-phase are guided outside from the same inter-teeth space between the adjacent coils, and
a tip of the lead of the coil and a tip of the end of the coil extend from an outer edge of one of the axial end surfaces of the stator core.

9. The brushless motor according to claim 8, wherein
the twelfth, the first, the sixth, and the seventh coils are connected in series in the stated order to form the W-phase,
the eighth, the ninth, the second, and the third coils are connected in series in the stated order to form the U-phase,
the fourth, the fifth, the tenth, and the eleventh coils are connected in series in the stated order to form the V-phase.

10. The brushless motor according to claim 8, wherein
the first through third connecting wires are disposed so that the coils do not cross each other.

11. The brushless motor according to claim 10, wherein
the first through third connecting wires are disposed at an outer edge of one axial end surface of the stator core,
the first and third connecting wires are disposed such that the wires overlap in part in an axial direction and are disposed at different axial positions, and the second connecting wire includes a bent part extending from below the third connecting wire and toward and above the first connecting wire in the axial direction.

12. The brushless motor according to claim 11, wherein the bent part is provided between the first coil and the twelfth coil.

13. A brushless motor comprising:
a stator including an annular stator core and first through twelfth teeth provided circumferentially on an inner circumference of the stator core in a sequential order;
first through twelfth coils wound around the first through twelfth teeth, respectively, and forming a delta connection;
a rotor provided at a center of the stator; and
a insulator attached to the stator, wherein
the first through twelfth coils are configured such that:
the twelfth, first, sixth, and seventh coils in series connection form a W-phase;
the eighth, ninth, second, and third coils in series connection form a U-phase,
the fourth, fifth, tenth, and eleventh coils in series connection form a V-phase,
coils of different phases adjacent to each other in an arrangement on the teeth are wound in the same direction,
coils of the same phase adjacent to each other are wound in opposite directions,
the W-phase includes a first connecting wire provided between a space between the twelfth coil and the first coil and a space between the sixth coil and the seventh coil and connecting the first coil and the sixth coil,
the U-phase includes a second connecting wire provided between a space between the eighth coil and the ninth coil and a space between the second coil and the third coil and connecting the ninth coil and the second coil, and
the V-phase includes a third connecting wire provided between a space between the fourth coil and the fifth coil and a space between the tenth coil and the eleventh coil and connecting the fifth coil and the tenth coil,
wherein the first through third connecting wires are disposed at an outer edge of one axial end surface of the stator core,
the first and third connecting wires are disposed such that the wires overlap in part in an axial direction and are disposed at different axial positions,
the second connecting wire includes a bent part extending from below the third connecting wire and toward and above the first connecting wire in the axial direction, and
the insulator includes locking parts that support the second connecting wire in different directions before and after the bent part,
the end of the coil forming the U-phase and the lead of the coil forming the V-phase are guided outside from the same inter-teeth space between the adjacent coils, or the end of the coil forming the V-phase and the lead of the coil forming the W-phase are guided outside from the same inter-teeth space between the adjacent coils, or the end of the coil forming the W-phase and the lead of the coil forming the U-phase are guided outside from the same inter-teeth space between the adjacent coils, and
a tip of a lead of a coil, a tip of an end of a coil, and a tip of the first through third connecting wires extend from an outer edge of one of the axial end surfaces of the stator core.

14. The brushless motor according to claim 13, wherein the first through third connecting wires are disposed so that the coils do not cross each other.

15. The brushless motor according to claim 13, wherein the twelfth, the first, the sixth, and the seventh coils are connected in series in the stated order to form the W-phase,
the eighth, the ninth, the second, and the third coils are connected in series in the stated order to form the U-phase,
the fourth, the fifth, the tenth, and the eleventh coils are connected in series in the stated order to form the V-phase.

16. The brushless motor according to claim 13, wherein the bent part is provided between the first coil and the twelfth coil.

* * * * *